(12) United States Patent
Kashimoto

(10) Patent No.: US 9,729,756 B2
(45) Date of Patent: Aug. 8, 2017

(54) IMAGE FORMING SYSTEM THAT RESTRAINS INCREASE OF PRINT DATA AMOUNT, IMAGE FORMING APPARATUS, AND RECORDING MEDIUM

(71) Applicant: KYOCERA Document Solutions Inc., Osaka (JP)

(72) Inventor: Yosuke Kashimoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/173,155

(22) Filed: Jun. 3, 2016

(65) Prior Publication Data
US 2016/0366302 A1  Dec. 15, 2016

(30) Foreign Application Priority Data

Jun. 12, 2015  (JP) .................................. 2015-119024

(51) Int. Cl.
*G06K 15/02* (2006.01)
*H04N 1/40* (2006.01)
*H04N 1/58* (2006.01)

(52) U.S. Cl.
CPC .......... *H04N 1/40068* (2013.01); *H04N 1/58* (2013.01); *H04N 2201/0094* (2013.01)

(58) Field of Classification Search
CPC ................. H04N 1/40068; H04N 1/58; H04N 2201/0094

USPC .......................................................... 358/1.2
See application file for complete search history.

(56) References Cited

U.S. PATENT DOCUMENTS

| | | | |
|---|---|---|---|
| 6,590,675 B1 * | 7/2003 | Tomiyasu | G06K 15/02 358/1.18 |
| 2003/0107773 A1 * | 6/2003 | Takamine | H04N 1/00291 358/296 |
| 2012/0045095 A1 * | 2/2012 | Tate | G06T 5/003 382/103 |
| 2013/0063736 A1 * | 3/2013 | Chiba | G06T 11/60 358/1.6 |
| 2014/0085681 A1 * | 3/2014 | Jung | H04N 1/3871 358/3.01 |

FOREIGN PATENT DOCUMENTS

JP  10-40029  2/1998

* cited by examiner

*Primary Examiner* — Neil R McLean
(74) *Attorney, Agent, or Firm* — Stein IP, LLC

(57) ABSTRACT

An image forming system prints an image including a plurality of objects. At least a part of the objects overlap with one another. The image forming system includes a computer and an image forming apparatus. The image forming apparatus includes a rendering circuit. When the rendering circuit processes the image object, the rendering circuit enhances a resolution of a part corresponding to the object in the image object based on a shape of the object overlapped at an upper side in the image object. When the rendering circuit enhances the resolution of the part corresponding to the object in the image object, the rendering circuit decides a color of the boundary based on the color information.

4 Claims, 17 Drawing Sheets

FIG. 5

| No. | ID | Coordinate | Attribution | Transparency Setting | Overlapping Target | Overlapping Condition |
|---|---|---|---|---|---|---|
| 1 | A | $(X_a, Y_a), (X_a', Y_a')$ | Vector | None | C | Partial |
| 2 | B | $(X_b, Y_b), (X_b', Y_b')$ | Vector | None | C | Fill |
| 3 | C | $(X_c, Y_c), (X_c', Y_c')$ | Raster | None | D | Enclosed |
|   |   |   |   |   | E | Partial |
|   |   |   |   |   | F | Enclosed |
|   |   |   |   |   | H | Partial |
| 4 | D | $(X_d, Y_d), (X_d', Y_d')$ | Vector | None | None | |
| 5 | E | $(X_e, Y_e), (X_e', Y_e')$ | Vector | Transparent | F | Partial |
|   |   |   |   |   | G | Partial |
| 6 | F | $(X_f, Y_f), (X_f', Y_f')$ | Text | Transparent | None | |
| 7 | G | $(X_g, Y_g), (X_g', Y_g')$ | Text | Transparent | None | |
| 8 | H | $(X_h, Y_h), (X_h', Y_h')$ | Text | Transparent | None | |

| No. | ID | Coordinate | Attribution | Overlapping Information | Color Information | Object Image |
|---|---|---|---|---|---|---|
| 1 | A | $(X_a, Y_a)$, $(X_a', Y_a')$ | Vector | | |  |
| 2 | E | $(X_e, Y_e)$, $(X_e', Y_e')$ | Vector | | |  |
| 3 | G | $(X_g, Y_g)$, $(X_g', Y_g')$ | Text | | Color information of boundaries of objects E and G |  |
| 4 | I | $(X_i, Y_i)$, $(X_i', Y_i')$ | Image | $E(X_e, Y_e), (X_e', Y_e')$ $G(X_g, Y_g), (X_g', Y_g')$ | |  |
| 5 | H | $(X_h, Y_h)$, $(X_h', Y_h')$ | Text | | Color information of boundaries of objects C and E |  |
| 6 | J | $(X_j, Y_j)$, $(X_j', Y_j')$ | Image | $E(X_e, Y_e), (X_e', Y_e')$ $H(X_h, Y_h), (X_h', Y_h')$ | Color information of boundaries of objects C and H |  |
| 7 | D | $(X_d, Y_d)$, $(X_d', Y_d')$ | Vector | | |  |

FIG. 15

| No. | ID | Coordinate | Attribution | Overlapping Information | Color Information | Object Image |
|---|---|---|---|---|---|---|
| 1 | A | $(X_a, Y_a)$, $(X_a', Y_a')$ | Vector | | |  |
| 2 | E | $(X_e, Y_e)$, $(X_e', Y_e')$ | Vector | | |  |
| 3 | G | $(X_g, Y_g)$, $(X_g', Y_g')$ | Text | | Color information of boundaries of objects E and G |  |
| 4 | I | $(X_i, Y_i)$, $(X_i', Y_i')$ | Image | $E(X_e, Y_e)$, $(X_e', Y_e')$ $G(X_g, Y_g)$, $(X_g', Y_g')$ | |  |
| 5 | F | $(X_f, Y_f)$, $(X_f', Y_f')$ | Text | | |  |
| 6 | H | $(X_h, Y_h)$, $(X_h', Y_h')$ | Text | | |  |
| 7 | J | $(X_j, Y_j)$, $(X_j', Y_j')$ | Image | $E(X_e, Y_e)$, $(X_e', Y_e')$ $F(X_f, Y_f)$, $(X_f', Y_f')$ $H(X_h, Y_h)$, $(X_h', Y_h')$ | Color information of boundaries of objects C and E Color information of boundaries of objects C and H Color information of boundaries of objects E and F |  |
| 8 | D | $(X_d, Y_d)$, $(X_d', Y_d')$ | Vector | | |  | ns
IMAGE FORMING SYSTEM THAT RESTRAINS INCREASE OF PRINT DATA AMOUNT, IMAGE FORMING APPARATUS, AND RECORDING MEDIUM

INCORPORATION BY REFERENCE

This application is based upon, and claims the benefit of priority from, corresponding Japanese Patent Application No. 2015-119024 filed in the Japan Patent Office on Jun. 12, 2015, the entire contents of which are incorporated herein by reference.

BACKGROUND

Unless otherwise indicated herein, the description in this section is not prior art to the claims in this application and is not admitted to be prior art by inclusion in this section.

A typical image forming system that can print an image including a plurality of objects includes an image forming system including a typical computer, which generates print data of the image, and a typical image forming apparatus, which executes rendering of the image based on the print data to print the image, has been known. The typical computer of the image forming system generates an image object indicating a state where objects overlap in the image and transmits at least one object included in the image and the generated image object to the typical image forming apparatus.

SUMMARY

An image forming system according to one aspect of the disclosure prints an image including a plurality of objects. At least a part of the objects overlap with one another. The image forming system includes a computer and an image forming apparatus. The computer includes a print data generating circuit to generate print data of the image. The image forming apparatus includes a rendering circuit to execute rendering of the image based on the print data to print the image. The computer includes an image generating circuit and a boundary color information generating circuit. The image generating circuit generates an image object to indicate a state where the objects are overlapped in the image with a reduced resolution at least partially compared with an actual resolution of the image. The boundary color information generating circuit generates color information of a boundary of the identical object with different shapes in the image and the image object. The print data generating circuit generates the print data including: at least one of the plurality of objects included in the image, the image object generated by the image generating circuit, and the color information generated by the boundary color information generating circuit. When the rendering circuit processes the image object, the rendering circuit enhances a resolution of a part corresponding to the object in the image object based on a shape of the object overlapped at an upper side in the image object. When the rendering circuit enhances the resolution of the part corresponding to the object in the image object, the rendering circuit decides a color of the boundary based on the color information.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 5 illustrates an exemplary object list generated by the computer according to the one embodiment;

FIG. 11 illustrates contents of exemplary print data generated based on the image illustrated in FIG. 6;

FIG. 15 illustrates exemplary print data generated based on the image illustrated in FIG. 6 and exemplary contents different from the example illustrated in FIG. 11.

DETAILED DESCRIPTION

Figure 1:
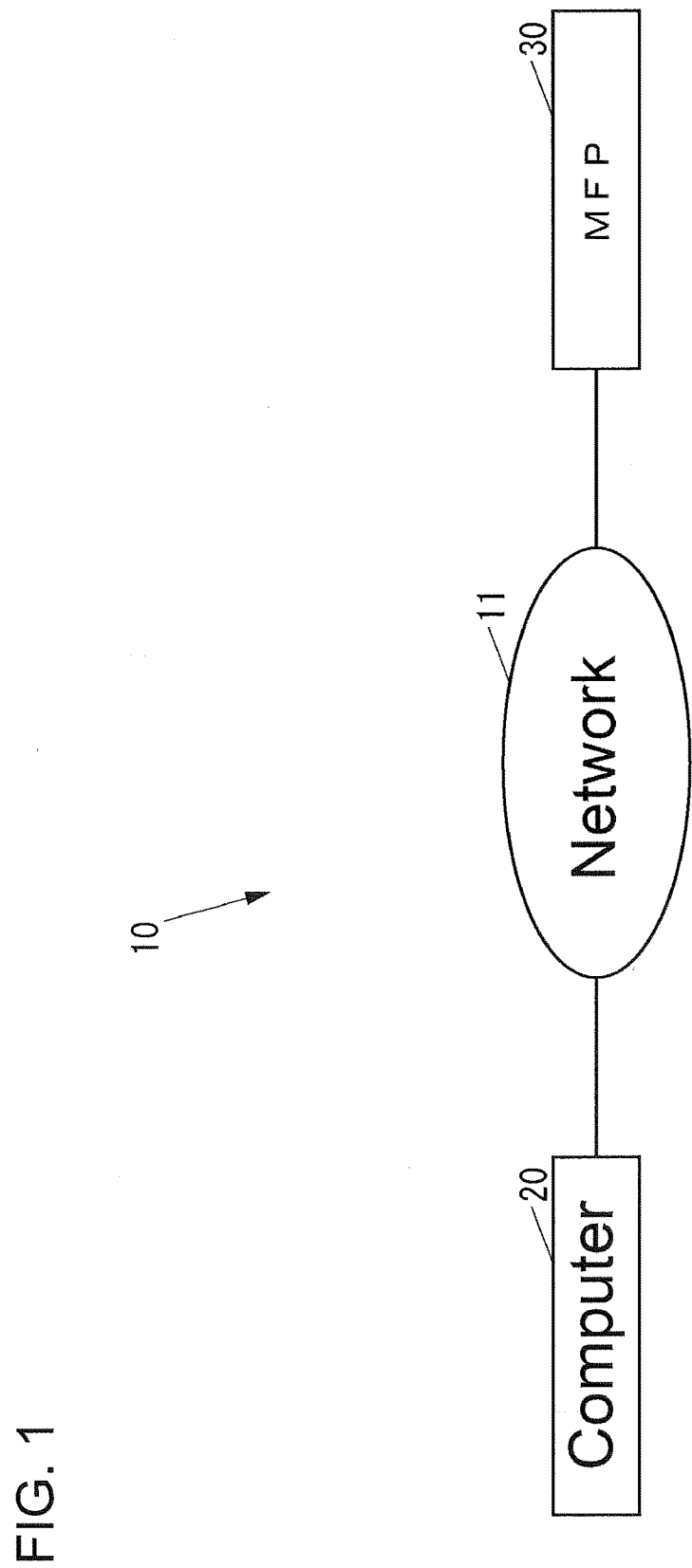
FIG. 1 illustrates an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure by referring to the drawings.

First, a description will be given of the configuration of an image forming system according to the embodiment.

FIG. 1 illustrates an image forming system 10 according to the one embodiment.

As illustrated in FIG. 1, the image forming system 10 includes a computer 20, which generates print data of an image, and a Multifunction Peripheral (MFP) 30, which is as an image forming apparatus for printing the image based on the print data. The computer 20 and the MFP 30 are communicatively connected via a network 11, such as a Local Area Network (LAN) and the Internet.

Figure 2:
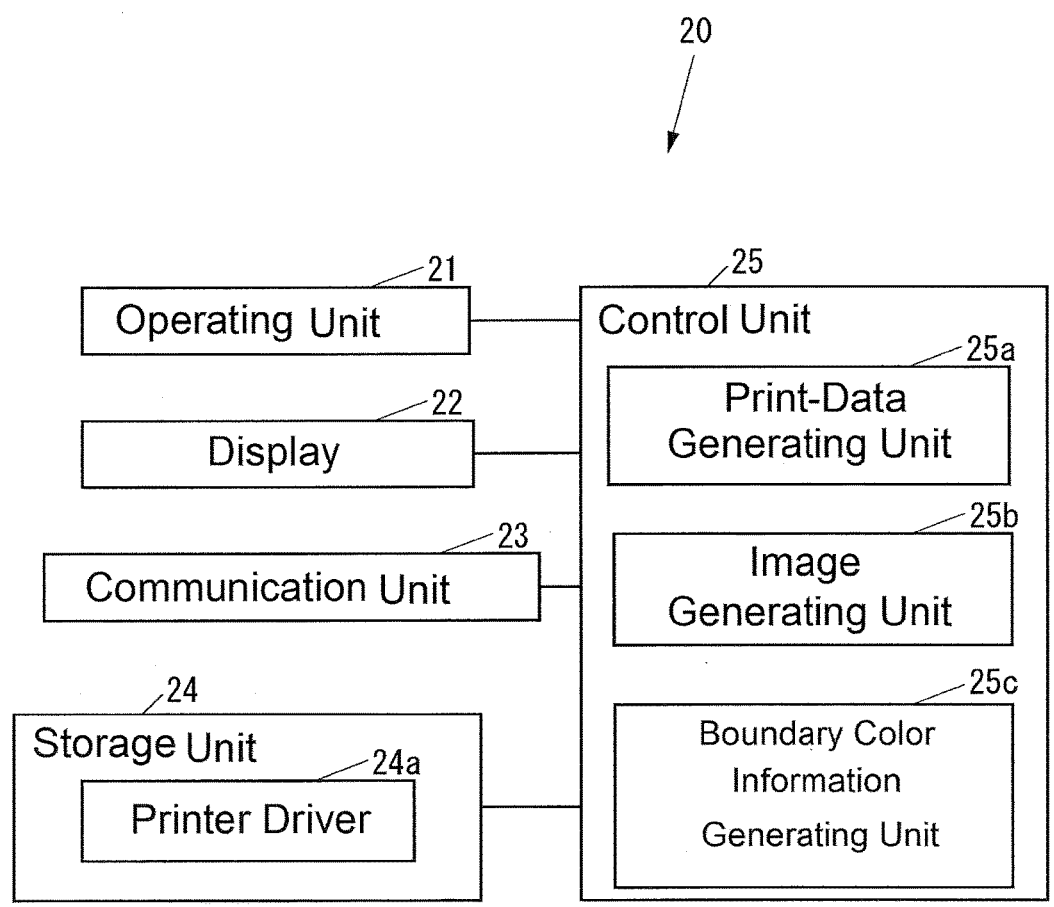
FIG. 2 illustrates a computer according to the one embodiment.

FIG. 2 illustrates the computer 20.

As illustrated in FIG. 2, the computer 20 includes an operation unit 21, a display 22, a communication unit 23, a storage unit 24, and a control unit 25. The operation unit 21 is an input device such as a computer mouse and a keyboard to which various operations are input. The display 22 is a display device such as a Liquid Crystal Display (LCD) that displays various pieces of information. The communication unit 23 is a communication device for communications with an external device such as the MFP 30 (see FIG. 1) via the network 11 (see FIG. 1). The storage unit 24 is a storage device such as a Hard Disk Drive (HDD) that stores a program and various pieces of data. The control unit 25 controls the entire computer 20. The computer 20 is configured by an electronic device, for example, a Personal Computer (PC) and a mobile device.

The storage unit 24 stores a printer driver 24a to control the MFP 30. The printer driver 24a may be installed to the computer 20 at a production stage of the computer 20, may be additionally installed from a storage medium such as a Compact Disk (CD), a Digital Versatile Disk (DVD), and a Universal Serial Bus (USB) memory to the computer 20, or may be additionally installed from the network 11 to the computer 20.

The control unit 25 includes, for example, a Central Processing Unit (CPU), a Read Only Memory (ROM), which preliminary stores programs and various kinds of data, and a Random Access Memory (RAM), which is used as a work area of the CPU. The CPU executes the program stored in the ROM or the storage unit 24.

The control unit 25 functions as a print-data generating unit (also referred to as a print-data generating circuit) 25a, an image generating unit (also referred to as an image generating circuit) 25b, and a boundary color information generating unit (also referred to as a boundary color information generating circuit) 25c. The print-data generating unit 25a generates the print data of the image by executing the printer driver 24a, which is stored in the storage unit 24. The image generating unit 25b generates an image object indicative of an overlapped state of objects in an image. The boundary color information generating unit 25c generates color information of boundaries of an identical object with different shapes in the image and the image object.

Figure 3:
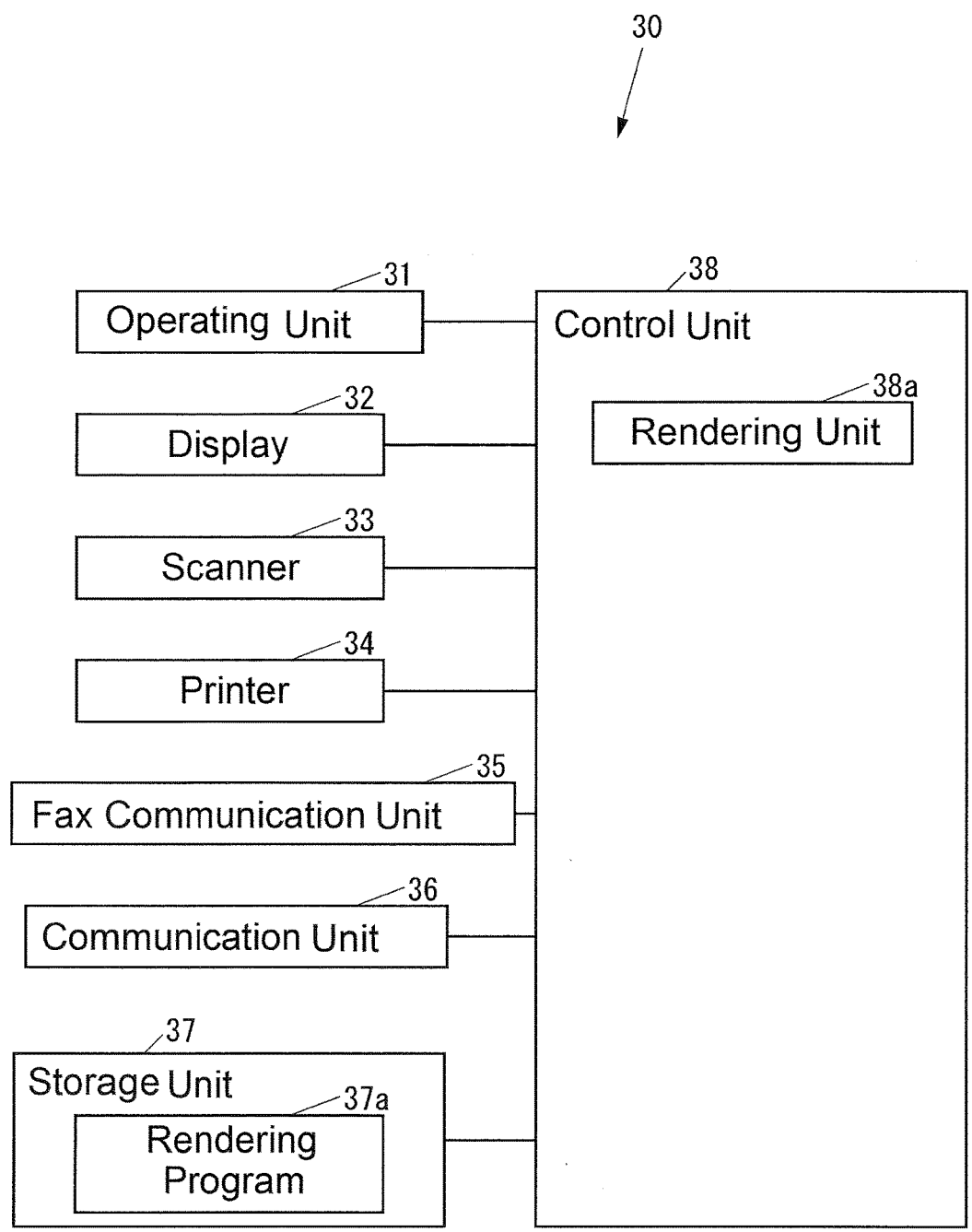
FIG. 3 illustrates an MFP according to the one embodiment.

FIG. 3 illustrates the MFP 30.

As illustrated in FIG. 3, the MFP 30 includes an operation unit 31, a display 32, a scanner 33, a printer 34, a fax communication unit 35, a communication unit 36, a storage unit 37, and a control unit 38. The operation unit 31 is an input device such as a button to which various operations are input. The display 32 is a display device such as a LCD that displays various pieces of information. The scanner 33 is a reading device for reading data from a document. The printer 34 is a print device for performing printing on a recording medium such as a paper sheet. The fax communication unit 35 is a fax device that performs fax communications with an external facsimile device (not illustrated) via a communication line such as a dial-up line. The communication unit 36 is a communication device that communicates with an external device such as the computer 20 (see FIG. 1) via the network 11 (see FIG. 1). The storage unit 37, which is a storage device such as a semiconductor memory and an HDD, stores various pieces of data. The control unit 38 controls the entire MFP 30.

The storage unit 37 stores a rendering program 37a for executing image rendering based on the print data. The rendering program 37a may be installed to the MFP 30 at the production stage of the MFP 30, may be additionally installed from a storage medium such as an SD card and a USB flash drive to the MFP 30, or may be additionally installed from the network 11 to the MFP 30.

The control unit 38 includes, for example, a CPU, a ROM, which stores programs and various kinds of data, and a RAM, which is used as a work area of the CPU. The CPU executes the program stored in the ROM or the storage unit 37.

The control unit 38 executes the rendering program 37a stored in the storage unit 37. Accordingly, the control unit 38 functions as a rendering unit 38a that executes image rendering based on the print data. The rendering unit 38a is also referred to as a rendering circuit.

Next, a description will be given of the operations of the image forming system 10.

First, the operations of the computer 20 when the computer 20 transmits the print data will be described.

Figure 4:
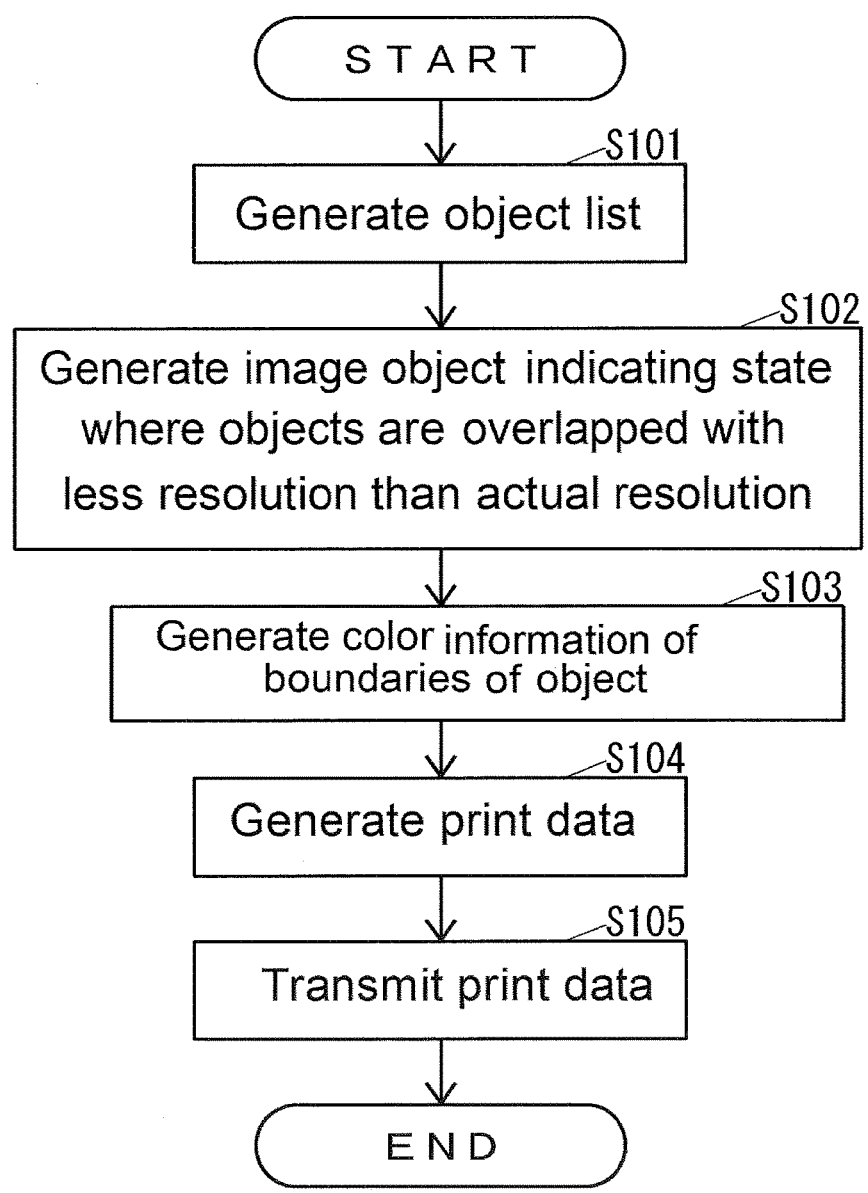
FIG. 4 illustrates operations of the computer according to the one embodiment when the computer transmits print data.

FIG. 4 illustrates the operations of the computer 20 when the computer 20 transmits the print data.

The control unit 25 of the computer 20 executes the printer driver 24a to perform the operations illustrated in FIG. 4.

As illustrated in FIG. 4, the control unit 25 generates an object list 40 (see FIG. 5) indicating a list of objects that include the image (Step S101).

FIG. 5 illustrates the exemplary object list 40 generated by the computer 20.

The object list 40 illustrated in FIG. 5 includes an "ID" as identification information of the target object, a "coordinate" indicating which position in the image the target object is arranged, an "attribution" of the target object, a "transparency setting" indicating whether or not the target object has transparency, an "overlapping target" indicating another object overlapping the target object, and an "overlapping condition" indicating how the object indicated in the "overlapping target" overlaps the target object. The object list 40 includes these items by each object.

The "coordinate" is indicated, for example, as a combination of an upper left coordinate and a lower right coordinate in a smallest rectangular surrounding the target object in the image.

The "attribution" includes, for example, a vector object, a raster object, and a text object.

The "overlapping condition" includes, for example, a "partial" indicating that only a part of the object indicated in the "overlapping target" overlaps the target object, a "fill" indicating that the object indicated in the "overlapping target" overlaps the whole target object, and an "enclosed" indicating that the whole object indicated in the "overlapping target" overlaps the target object.

The lower the object is indicated in the column of the object list 40, the upper the object is arranged in the layer of the image.

Figure 6:
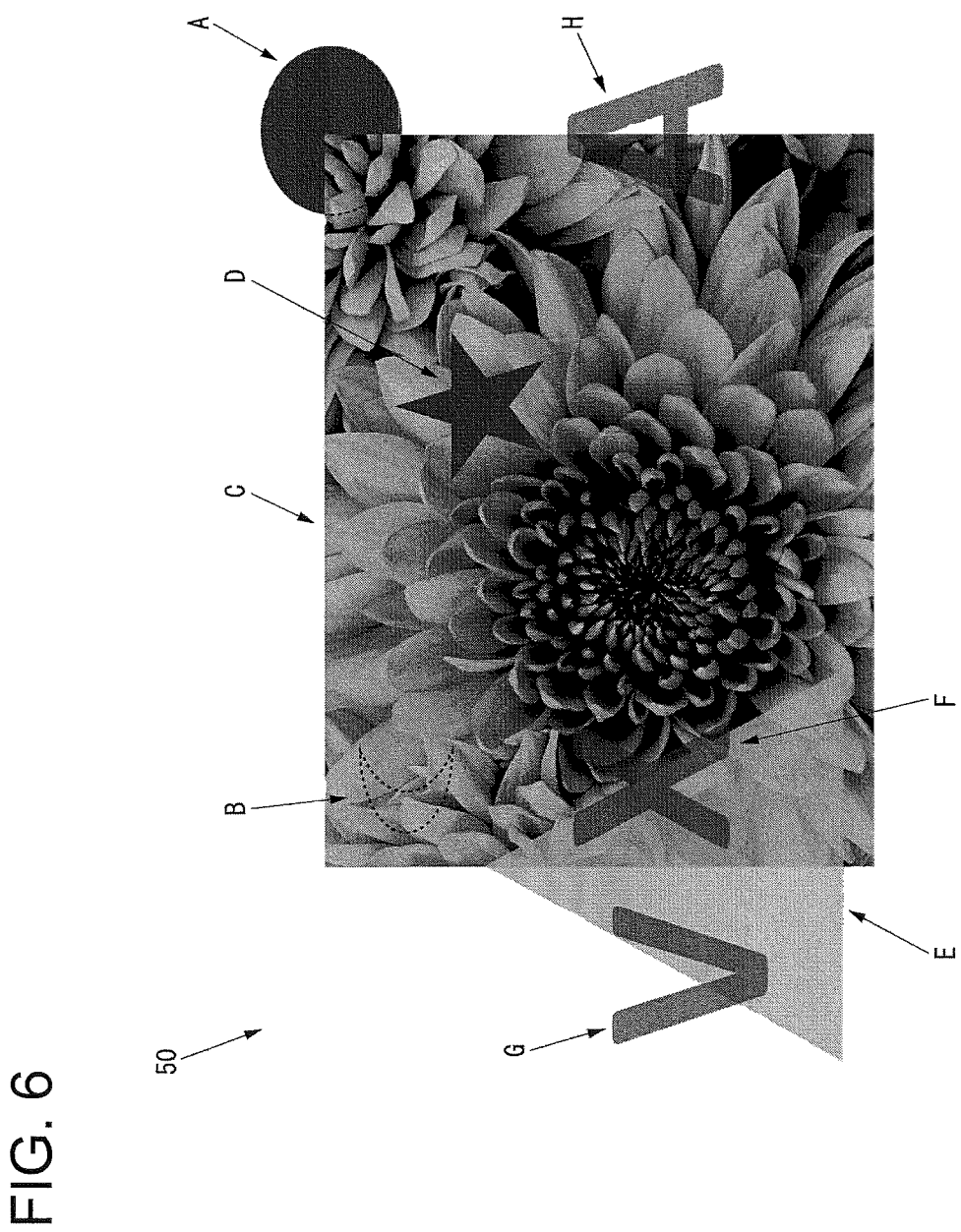
FIG. 6 illustrates an image on which the object list according to the one embodiment is based.

FIG. 6 illustrates an image 50 on which the object list 40 illustrated in FIG. 5 is based.

As illustrated in FIGS. 5 and 6, an object with ID "A" (hereinafter referred to as "object A." The same applies to B to H.) is a vector object in an elliptical shape without transparency. On the object A, only a part of an object C without transparency is overlapped. While a part of the object A is drawn by the dashed line in FIG. 6 for easy understanding, the part does not appear actually in the image 50.

An object B is a vector object in a crescent shape without transparency. On the object B, the object C without transparency overlaps the whole object B. While the object B is drawn by the dashed line in FIG. 6 for easy understanding, the object B is an object that does not appear actually in the image 50.

The object C is a raster object with a flower pattern in a rectangular shape without transparency. On the object C, a whole object D without transparency, only a part of an object E with transparency, a whole object F with transparency, and only a part of an object H with transparency are overlapped.

The object D is a vector object in a star shape without transparency. On the object D, no other objects are overlapped.

The object E is a vector object in a triangular shape with transparency. On the object E, only a part of the object F with transparency and only a part of an object G with transparency are overlapped.

The object F is a text object of a character "X" with transparency. On the object F, no other objects are overlapped.

The object G is a text object of a character "V" with transparency. On the object G, no other objects are overlapped.

The object H is a text object of a character "A" with transparency. On the object H, no other objects are overlapped.

As illustrated in FIG. 4, after the process of Step S101, the image generating unit 25*b* of the computer 20 generates the image object that indicates a state of objects overlapping in the image 50 based on the "attribution," the "transparency setting," the "overlapping target," and the "overlapping condition" of the object list 40 generated at Step S101, and a specific rule. The image generating unit 25*b* generates the image object with making the resolution of at least a part of the image object lower than the actual resolution of the image 50 (Step S102). For example, the image generating unit 25*b* may generate only the image object that includes a state where the objects are overlapped with transparency in the image 50. When the image generating unit 25*b* generates the image object, the image generating unit 25*b* generates overlapping information that indicates which object the target image object overlaps with, and adds the overlapping information to the target image object. The image generating unit 25*b* generates the image object as necessary. Then, the process of Step S102 is omitted if it is not necessary.

Figure 7A:
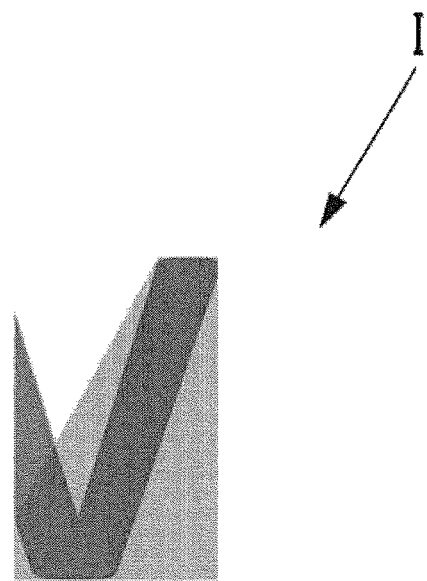
FIG. 7A illustrates an exemplary image object generated by the computer according to the one embodiment.
Figure 7B:
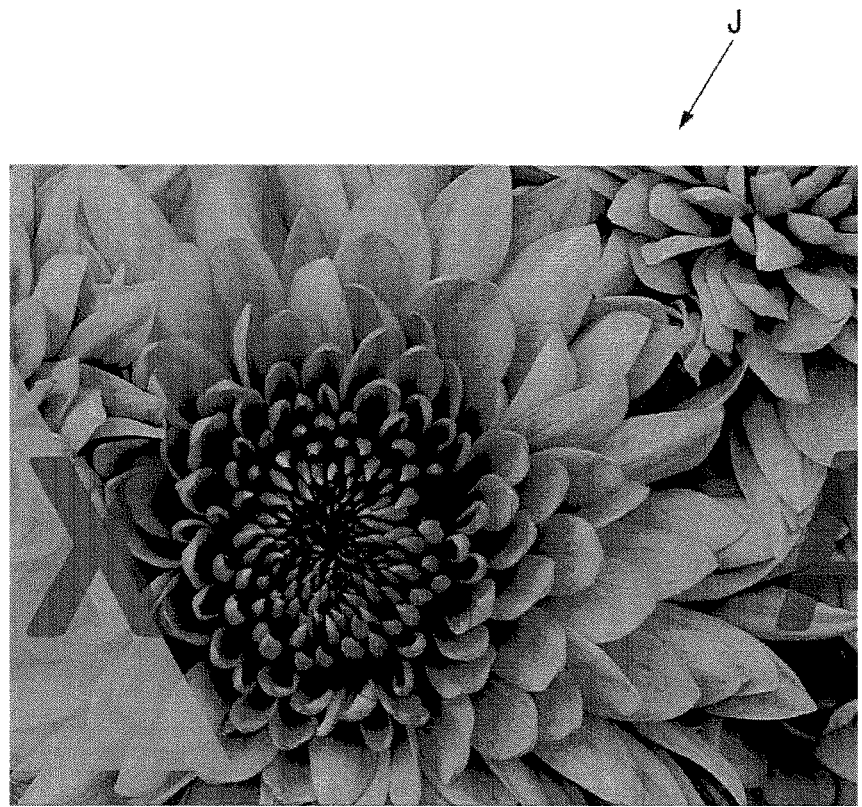
FIG. 7B illustrates an exemplary image object generated by the computer according to the one embodiment but different from the example illustrated in FIG. 7A.

For example, at the process of Step S102, the image generating unit 25*b* generates an object I illustrated in FIG. 7A and an object J illustrated in FIG. 7B as the image objects for the image 50 illustrated in FIG. 6.

The object I illustrated in FIG. 7A is the image object indicating a state where the object G overlaps the object E in the image 50.

The object J illustrated in FIG. 7B is the image object indicating a state where the object E, the object F, and the object H overlap the object C in the image 50.

As illustrated in FIG. 4, after the process of Step S102, the boundary color information generating unit 25*c* of the computer 20 generates the color information of boundaries of the identical object with different shapes in the image and the image object generated at Step S102 (Step S103).

Figure 8A:
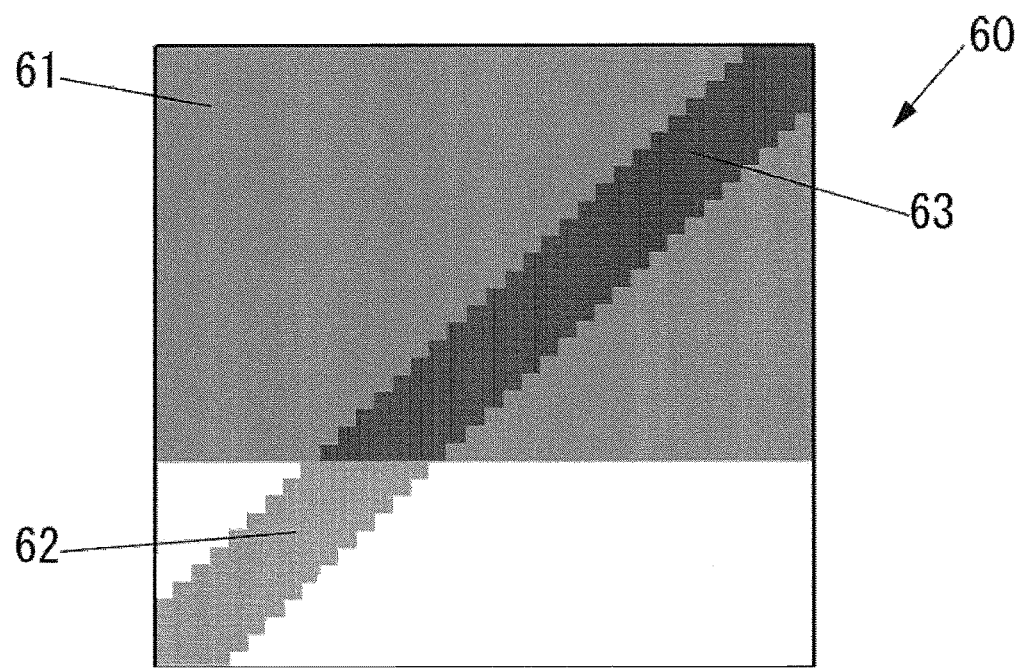
FIG. 8A illustrates an example of an image target for operations according to the one embodiment.

For example, the following describes the case where the image target for the operations illustrated in FIG. 4 is an image 60 illustrated in FIG. 8A.

Figure 8B:
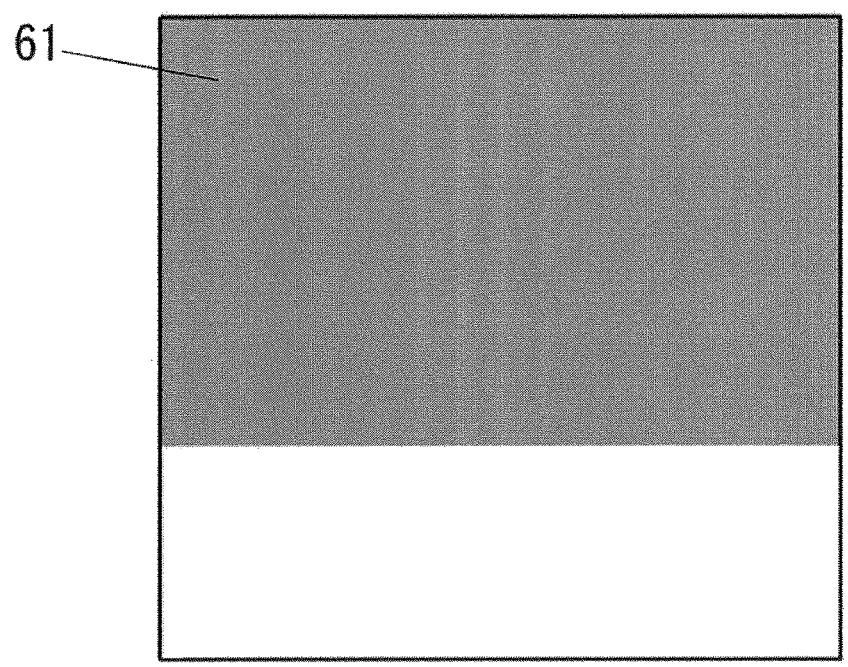
FIG. 8B illustrates a raster object among the images illustrated in FIG. 8A.
Figure 8C:
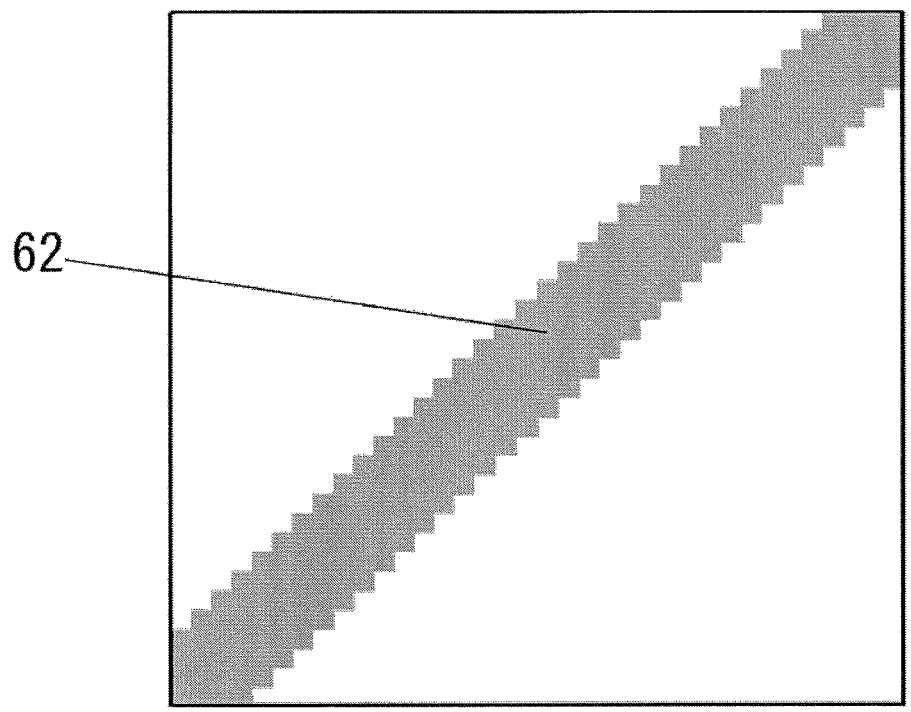
FIG. 8C illustrates a vector object among the images illustrated in FIG. 8A.

Here, the image 60 illustrated in FIG. 8A is the image showing a vector object 62 with transparency illustrated in FIG. 8C overlapping a raster object 61 illustrated in FIG. 8B. A region 63 illustrated in FIG. 8A is a region where the vector object 62 overlaps the raster object 61 in the image 60.

Figure 9A:
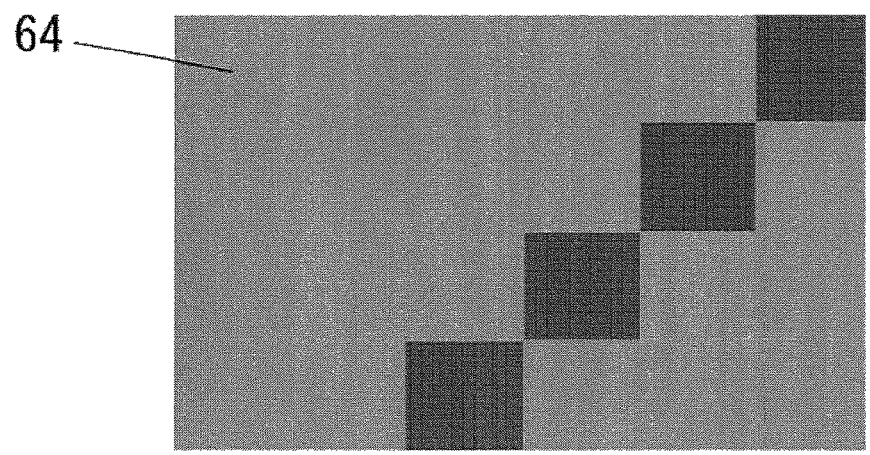
FIG. 9A illustrates an example of an image object generated when the image target for the operations according to the one embodiment is the image illustrated in FIG. 8A.

An image object 64 illustrated in FIG. 9A is an example of the image object generated at the process of Step S102 when the image target for the operations illustrated in FIG. 4 is the image 60 illustrated in FIG. 8A. The image object 64 shows the overlapping state of the raster object 61 (see FIG. 8B) and the vector object 62 (see FIG. 8C) in the image 60 (see FIG. 8A). The image object 64 is a raster object generated in a state where the resolution of a part that the vector object 62 overlaps the raster object 61 is made lower than the actual resolution of the image 60.

Figure 9B:
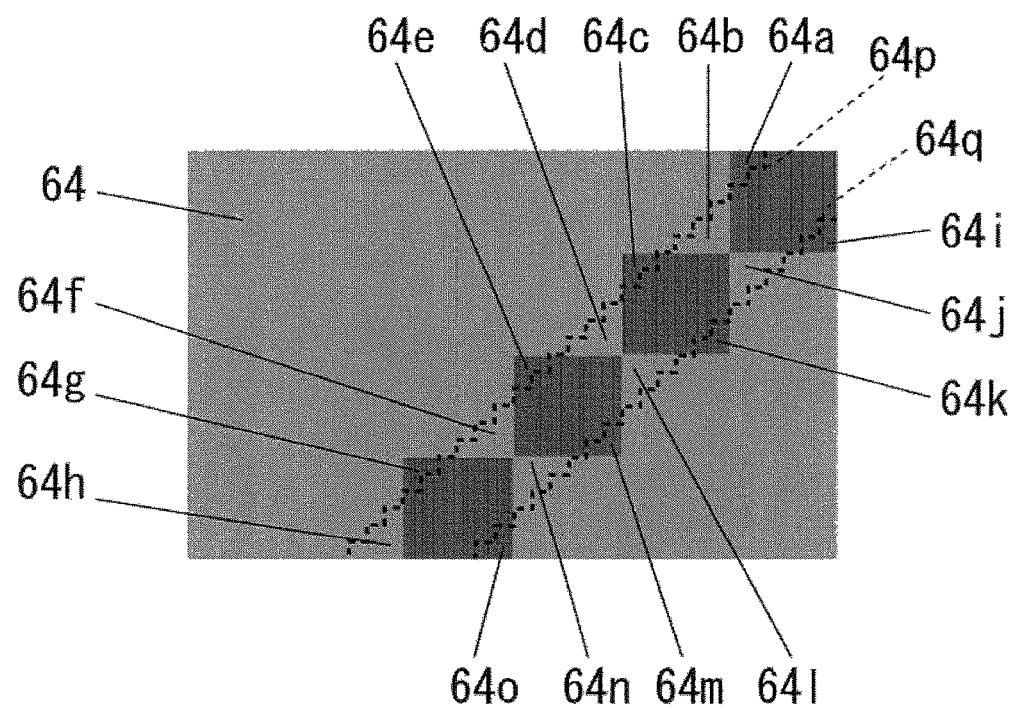
FIG. 9B illustrates boundaries of the raster object and the vector object included in the image object illustrated in FIG. 9A.

FIG. 9B illustrates boundaries 64*a*, 64*b*, 64*c*, 64*d*, 64*e*, 64*f*, 64*g*, 64*h*, 64*i*, 64*j*, 64*k*, 64*l*, 64*m*, 64*n*, and 64*o* of the raster object 61 and the vector object 62 included in the image object 64 illustrated in FIG. 9A. The order of the boundaries 64*a* to 64*o* is decided from a boundary line 64*p* at the left edge to a boundary line 64*q* at the right edge among the boundary lines 64*p* and 64*q* between the raster object 61 and the vector object 62. That is, the order of the boundaries 64*a* to 64*o* illustrated in FIG. 9B is decided such that the boundaries 64*a* to 64*h* around the boundary line 64*p* are followed by the boundaries 64*i* to 64*o* around the boundary line 64*q*. The order of the boundaries constituting the identical boundary line is decided from the upper end to the lower end. That is, the order of the boundaries 64*a* to 64*h* around the boundary line 64*p* illustrated in FIG. 9B is decided in the order of the boundaries 64*a*, 64*b*, 64*c*, 64*d*, 64*e*, 64*f*, 64*g*, and 64*h* starting from the boundary 64*a* on the upper end. The order of the boundaries 64*i* to 64*o* around the boundary line 64*q* illustrated in FIG. 9B is decided in the order of the boundaries 64*i*, 64*j*, 64*k*, 64*l*, 64*m*, 64*n*, and 64*o* starting from the boundary 64*i* on the upper end.

Figure 10:
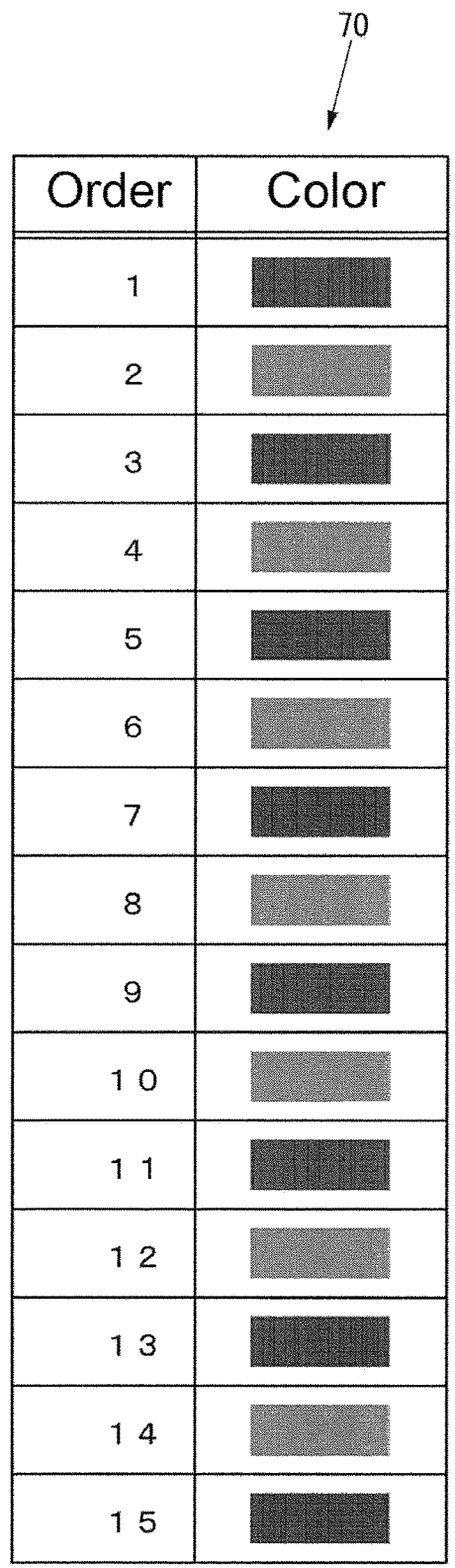
FIG. 10 illustrates color information of the boundaries illustrated in FIG. 9B.

FIG. 10 illustrates color information 70 of the boundaries 64*a* to 64*o* illustrated in FIG. 9B.

In FIG. 10, the colors with the orders of 1 to 15 indicate the colors of the boundaries 64*a* to 64*o* in this order, respectively. That is, the first color is the color of the boundary 64*a*, and the fifteenth color is the color of the boundary 64*o*.

As illustrated in FIG. 4, after the process of Step S103, the print-data generating unit 25*a* of the computer 20 generates print data 80 of Page Description Language (PDL) illustrated in FIG. 11 (Step S104).

FIG. 11 illustrates contents of the exemplary print data 80 generated based on the image 50 illustrated in FIG. 6.

In the print data 80 illustrated in FIG. 11, an order of overlapping of the objects is changed because the MFP 30 can perform overwrite processing of the object to generate the image. That is, when the MFP 30 generates the image, the lower the object is listed in FIG. 11, the upper layer the object is arranged. In the print data 80, the "transparency setting" in the image 50 is deleted.

In the print data 80, overlapping information, which indicates that the object I, the image object, is overlapped on the object E and the object G, is added to the object I. Similarly, in the print data 80, the overlapping information, which indicates that the object J, the image object, is overlapped on the object E and the object H, is added to the object J.

In the print data 80, the color information of the boundaries of the object E and the object G with different shapes in the image 50 and the object I, which is the image object, is added to the object I. Similarly, in the print data 80, the color information of the boundaries of the object C and the object E with different shapes in the image 50 and the object J, which is the image object, is added to the object J. Similarly, in the print data 80, the color information of the boundaries of the object C and the object H with different shapes in the image 50 and the object J, which is the image object, is added to the object J.

As illustrated in FIG. 4, the control unit 25 of the computer 20 transmits the print data generated at Step S104 to the MFP 30 via the communication unit 23 (Step S105). Then, the control unit 25 terminates the operation illustrated in FIG. 4.

Next, a description will be given of the operations of the MFP 30 when the MFP 30 receives the print data to execute printing.

Figure 12:
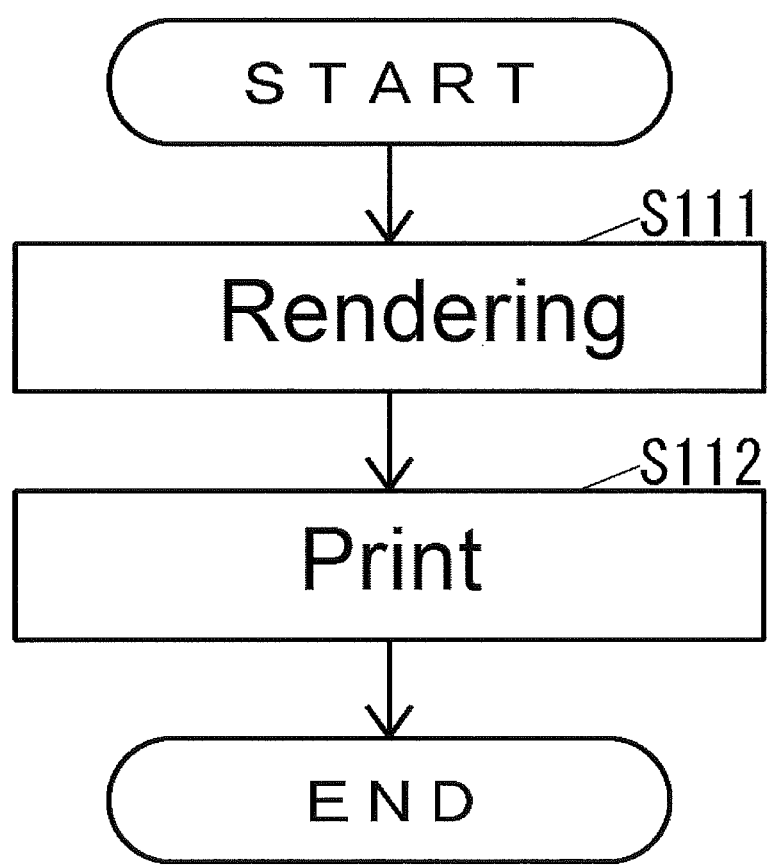
FIG. 12 illustrates operations of the MFP according to the one embodiment when the MFP receives the print data to execute printing.

FIG. 12 illustrates the operations of the MFP 30 when the MFP 30 receives the print data and executes printing.

When the control unit 38 of the MFP 30 receives the print data via the communication unit 36, the control unit 38 executes the rendering program 37*a* to perform the operations illustrated in FIG. 12.

As illustrated in FIG. 12, the rendering unit 38*a* of the control unit 38 interprets the print data received via the communication unit 36 to execute rendering (Step S111). Here, when the rendering unit 38*a* processes the image objects, the rendering unit 38*a* enhances the resolution of a part corresponding to the object in the image object based on the shape of the object on which the image object is overlapped, which is indicated by the overlapping information.

For example, a description will be given of a state where the computer 20 generates print data 90 illustrated in FIG. 13 based on the image 60 illustrated in FIG. 8A.

Figure 13:
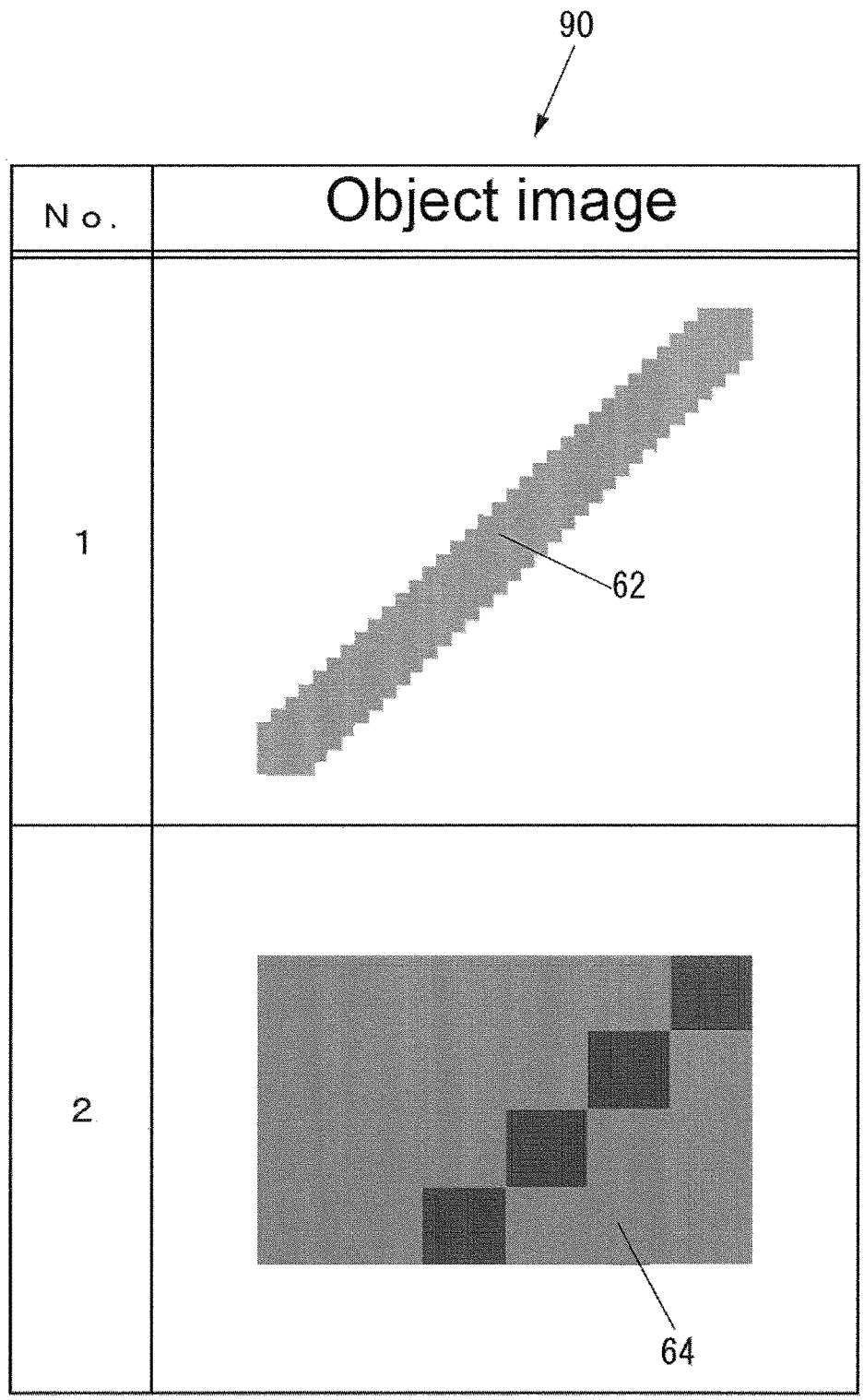
FIG. 13 illustrates contents of exemplary print data generated based on the image illustrated in FIG. 8A.

The print data 90 illustrated in FIG. 13 indicates that the image object 64 overlaps on the vector object 62. In FIG. 13, the ID, the coordinate, the attribution, the overlapping information, and the color information are omitted.

Figure 14A:
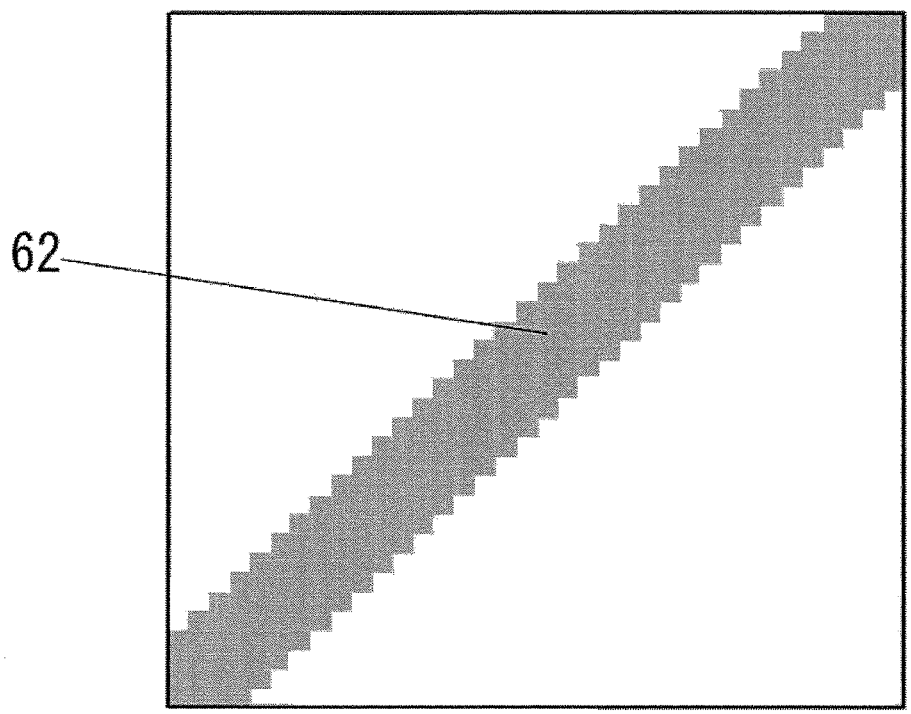
FIG. 14A illustrates a state of a process when an image is generated based on the print data illustrated in FIG. 13.

First, as illustrated in FIG. 14A, the rendering unit 38*a* draws the vector object 62 based on the print data 90.

Figure 14B:
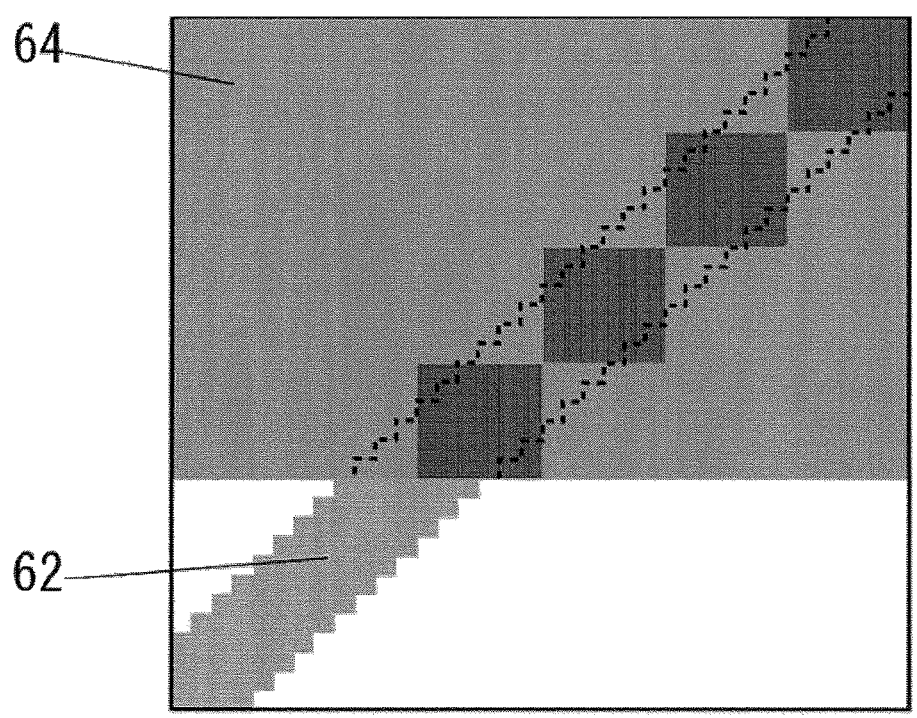
FIG. 14B illustrates a state of a process after the process illustrated in FIG. 14A.

Next, as illustrated in FIG. 14B, the rendering unit 38*a* draws the image object 64 on the vector object 62 based on the print data 90. In FIG. 14B, while a part hidden under the image object 64 of the vector object 62 is drawn by the dashed line for easy understanding, the dashed line part does not appear actually.

Lastly, the rendering unit 38*a* enhances the resolution to the part corresponding to the vector object 62 in the image object 64 based on the shape of the vector object 62 indicated on which the image object 64 overlaps by the overlapping information of the print data 90. Here, to enhance the resolution of the part corresponding to the vector object 62 in the image object 64, the rendering unit 38*a* decides the colors of the boundaries 64*a* to 64*o* (see FIG. 9B) in the image object 64 based on the color information 70 (see FIG. 10). Accordingly, the rendering unit 38*a* can generate an image equal to the image 60 illustrated in FIG. 8A.

Figure 14C:
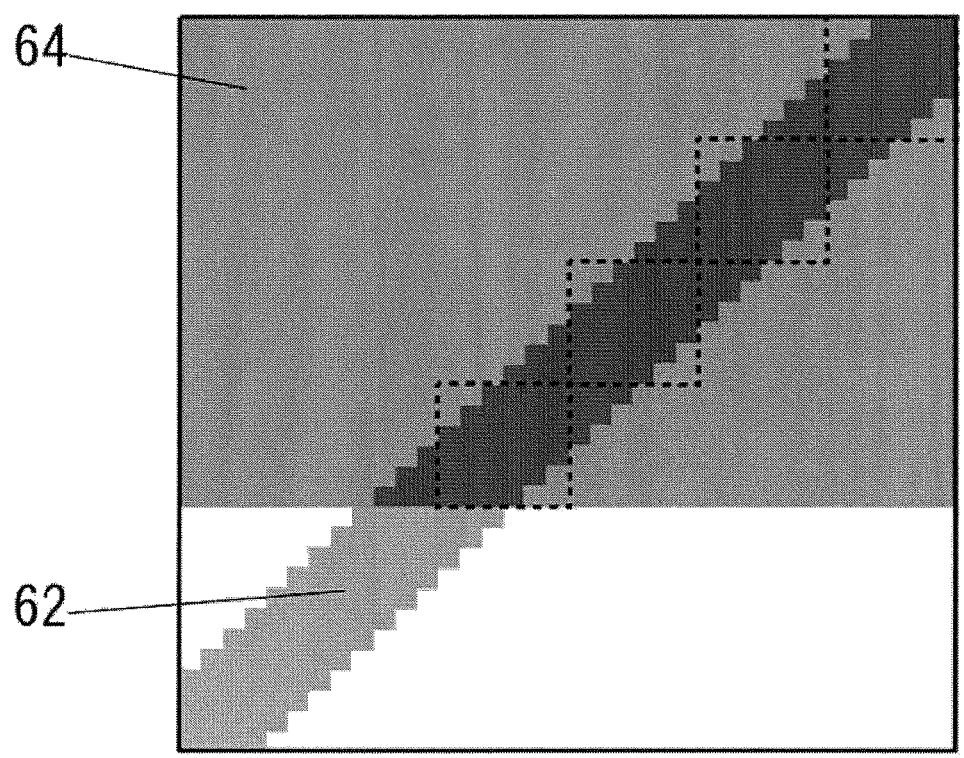
FIG. 14C illustrates a state of a process after the process illustrated in FIG. 14B.

In FIG. 14C, while a low resolution part in the image object 64 is drawn by the dashed line for easy understanding, the dashed line part does not appear actually.

As illustrated in FIG. 12, after the process of Step S111, the control unit 38 prints the image generated at the process of Step S111 by the printer 34 (Step S112). Then, the control unit 38 terminates the processes illustrated in FIG. 12.

As described above, the image forming system 10 generates the image object included in the print data in a state where the resolution of at least a part of the image object is made lower than the actual resolution of the image (Step S102). Accordingly, the image forming system 10 can restrain an increase in the data amount of the print data.

When the image forming system 10 executes image rendering based on the print data (Step S111), in processing the image object, the image forming system 10 enhances the resolution of the part corresponding to the object in the image object based on the shape of the object overlapped above in the image object. This ensures restraining a deterioration of the printing result quality. Especially, when the image forming system 10 enhances the resolution of the part corresponding to the object in the image object, the image forming system 10 decides the color of the boundaries of the object in the image object based on the color information in the print data. This ensures restraining a deterioration of the printing result quality.

In the image forming system 10, the MFP 30 is not necessary to determine which image object overlaps which object based on the image object and the object in the print data because the print data includes the overlapping information. Accordingly, the image forming system 10 can reduce the processing time of the print data in the MFP 30.

Insofar as the image forming system 10 has a configuration that the MFP 30 determines which image object overlaps which object based on the image object and the object in the print data, the print data is not necessary to include the overlapping information.

The image forming system 10 generates only the image object including a state where the objects are overlapped with transparency in the image. This ensures reducing the number of image objects included in the print data. Accordingly, the image forming system 10 can reduce the increase in the data amount of the print data.

Regarding in which state of the image object that the object is overlapped in the image is to be generated, the image forming system 10 may employ a condition other than a condition that generates only the image object including the state where the objects are overlapped with transparency in the image.

As the object B in the image 50 is not included in the print data 80, the image forming system 10 includes only the object actually appearing in the image in the print data. This ensures reducing the number of objects included in the print data. Accordingly, the image forming system 10 can reduce the increase in the data amount of the print data. The object not appearing actually in the image does not appear even in the printing result. Then, even if the object is not included in the print data, the printing result quality is not declined.

As the object F in the image 50 is not included in the print data 80, the image forming system 10 does not include an object entirely included in the image object in the print data. This ensures reducing the number of objects included in the print data. Accordingly, the image forming system 10 can reduce the increase in the data amount of the print data. Even if the resolution of the corresponding part in the image object is not enhanced, the object entirely included in the image object all has the identical resolution. Then, the image forming system 10 can reduce the uncomfortable feeling in the printing result.

As illustrated in FIG. 15, the image forming system 10 may include the object F included in the image object J as a whole in the print data.

As long as the boundary color information generating unit 25c of the computer 20 and the rendering unit 38a of the MFP 30 can accurately recognize the identical boundaries, the image forming system 10 may employ a method of deciding the order of the boundaries of the color information other than the above-described methods.

While the image forming apparatus of the disclosure is an MFP in the embodiment, insofar as the device that prints the image based on the print data, the image forming apparatus other than the MFP such as a printer-only machine may be employed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system for printing an image including a plurality of objects, at least a part of the objects overlapping with one another, the image forming system comprising:
    a computer that includes a print data generating circuit to generate print data of the image; and
    an image forming apparatus that includes a rendering circuit to execute rendering of the image based on the print data to print the image, wherein:
    the computer generates an object list indicating a list of the plurality of objects that constitutes the image;
    the object list includes (i) identification information of the object, (ii) a coordinate indicating which position in the image the object is arranged, (iii) an attribution of the object including a vector object, a raster object, and a text object, (iv) a transparency setting indicating whether or not the object has transparency, (v) an overlapping target indicating another object overlapping the object, and (vi) an overlapping condition including a partial, a fill, and an enclosed, and indicating how the other object indicated in the overlapping target overlaps the object;
    the computer further includes an image generating circuit that (i) generates an image object to indicate a state where the objects are overlapped in the image based on the attribution, the transparency setting, the overlapping target, and the overlapping condition included in the object list, with a reduced resolution at least partially compared with an actual resolution of the image, (ii) generates overlapping information that indicates which image object overlaps on which object, and (iii) adds the overlapping information to the target image object;
    the computer further includes a boundary color information generating circuit that generates color information of a boundary of i) a first specified object with the reduced solution at least partially in the image object and ii) a second specified object with the actual solution in the image the first specified object in the image object and the second specified object in the image being identical with different shapes;
    the print data generating circuit generates the print data including: at least i) the plurality of objects included in the image; ii) the image object generated by the image generating circuit; iii) the overlapping information generated by the image generating circuit; and iv) the color information generated by the boundary color information generating circuit;
    the rendering circuit enhances, when processing the image object, a resolution of a part corresponding to the object in the image object based on a shape of the object indicated by the overlapping information, and
    the rendering circuit decides, when enhancing the resolution of the part corresponding to the object in the image object, a color of the boundary based on the color information.

2. The image forming system according to claim 1, wherein the image generating circuit generates only the image object in a state where the object with transparency overlaps in the image.

3. The image forming system according to claim 1, wherein the print data generating circuit does not include the object that is included in the image object as a whole in the print data.

4. The image forming system according to claim 1, wherein the print data generating circuit includes only the object actually appearing in the image in the print data.

* * * * *